United States Patent
Du et al.

(10) Patent No.: US 8,890,669 B2
(45) Date of Patent: Nov. 18, 2014

(54) METHOD FOR MONITORING BY COLLABORATING BETWEEN MTC DEVICES, RELATED DEVICE AND SYSTEM

(75) Inventors: Hongfei Du, Shanghai (CN); Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 232 days.

(21) Appl. No.: 13/520,291

(22) PCT Filed: Jan. 4, 2010

(86) PCT No.: PCT/CN2010/070002
§ 371 (c)(1),
(2), (4) Date: Jul. 2, 2012

(87) PCT Pub. No.: WO2011/079528
PCT Pub. Date: Jul. 7, 2011

(65) Prior Publication Data
US 2013/0002413 A1    Jan. 3, 2013

(51) Int. Cl.
*B60R 25/10* (2013.01)
*H04W 12/00* (2009.01)
*H04W 4/02* (2009.01)
*H04W 4/22* (2009.01)
*B60R 25/30* (2013.01)
*H04W 4/00* (2009.01)

(52) U.S. Cl.
CPC .............. *H04W 4/005* (2013.01); *H04W 12/00* (2013.01); *B60R 25/10* (2013.01); *H04W 4/02* (2013.01); *H04W 4/22* (2013.01); *B60R 25/30* (2013.01)
USPC ........................................ 340/426.1; 340/463

(58) Field of Classification Search
CPC ...... H04W 4/005; H04W 4/006; B60R 25/00; B60R 25/102; B60R 25/10
USPC ....................................................... 340/426.1
See application file for complete search history.

(56) References Cited

U.S. PATENT DOCUMENTS

| | | | |
|---|---|---|---|
| 8,185,629 B2 * | 5/2012 | Hoeksel | 709/225 |
| 2006/0271246 A1 * | 11/2006 | Bell et al. | 701/1 |
| 2008/0081638 A1 * | 4/2008 | Boland et al. | 455/456.1 |

FOREIGN PATENT DOCUMENTS

| | | |
|---|---|---|
| CN | 101179636 A | 5/2008 |
| JP | 2004-161121 | 6/2004 |
| JP | 2006-035990 | 2/2006 |

OTHER PUBLICATIONS

"Notice of Reasons for Refusal," of corresponding Japanese Application No. 2012-547422, dated Aug. 13, 2013, 6 pages.
International Search Report for PCT/CN2010/070002 dated Oct. 28, 2010.

* cited by examiner

*Primary Examiner* — Kerri McNally
(74) *Attorney, Agent, or Firm* — Fay Sharpe LLP

(57) ABSTRACT

The present invention provides a method for collaboratively monitoring by means of MTC devices in a wireless communication network and related MTC devices and system. Each of the MTC devices is connected to a MTC server via said wireless communication network and includes a transceiver having a unique ID and security code, and said transceiver periodically broadcasts its normal or abnormal status information to other MTC devices within a certain range in the vicinity of that MTC device and detects and identifies other MTC devices within said range. Said method comprises that, in case that the MTC device is operated illegally: if its transceiver is not destroyed, then the MTC device will send an alarm message to the MTC server and report information about its current location; if its transceiver is destroyed, then the MTC device will send once to the MTC server an alarm message, and said other MTC device(s) will send to the MTC server an alarm message and report information about their current location since it does not detect a legal broadcast signal sent by the MTC device.

11 Claims, 4 Drawing Sheets

METHOD FOR MONITORING BY COLLABORATING BETWEEN MTC DEVICES, RELATED DEVICE AND SYSTEM

FIELD OF THE INVENTION

The present invention relates to the field of communications, and more particularly to techniques of monitoring by collaborating between Machine Type Communication (MTC) devices.

BACKGROUND OF THE INVENTION

Because of the high theft/vulnerable nature of MTC devices, e.g., in-vehicle device (IVD), tracking/alarming systems become very popular nowadays. For IVD-based scenario, these systems can be classified into three types: lock devices, alarm systems, and vehicle tracking/recovery systems. However, they have the following deficiencies.

- The commonly used vehicle anti-theft lock (such as a steering wheel anti-theft lock) is relatively cheap, it is inconvenient to use and may be easily disarmed by skilled thieves.
- Majority of car alarm systems send out frequently false alarms.
- The commonly used vehicle tracking/recovery systems are based on radio signals, such as the Lojack tracking system, the ProScout GPS Vehicle Tracking System, the TravelEyes2 Vehicle Tracking System and so on. After a vehicle has been stolen, the owner can report the problem to the police or the GPS tracking office. The wireless transmitter or the GPS device in the car will be used to pinpoint the location and lead police to rapid recovery. However, these systems have high upfront purchase price as well as maintenance cost (e.g. a monthly monitoring fee) and are easy to defeat by simply breaking off the antenna or covering it with metal, and then the GPS tracking system will become useless.

The aforementioned three systems are vulnerable because it is easy to be removed/destroyed, even if the alarm is not removed, the stolen vehicle is difficult to be tracked after the vehicle is on the road.

Recent advanced research in sensor-network-based vehicle anti-theft system operates within a limited parking lot area, because of the limited wireless access of a base-station. Stolen vehicles can be detected by other vehicles in the parking lot and reported to its local base station. However, the stolen vehicle is often driven faster than the base station can response, and it will be lost once the vehicle is driven out of the parking surveillance area.

In the above mentioned systems, the owner is able to report the car theft but incapable of tracking the current location of the vehicle without the GPS positioning function or in case of this function being destroyed, which brings hurdles for quick recovery.

SUMMARY OF THE INVENTION

The aim of the present invention is to solve the above mentioned problem in the prior art.

According to an aspect of the present invention, a method for collaboratively monitoring by means of Machine Type Communication MTC devices in a wireless communication network is proposed, wherein each of the MTC devices is connected to a MTC server via said wireless communication network and includes a transceiver having a unique ID and security code, and said transceiver periodically broadcasts its normal or abnormal status information to other MTC devices within a certain range in the vicinity of that MTC device and detects and identifies other MTC devices within said range, said method comprises the following steps of: the MTC device sending to the MTC server an alarm message and reporting information about its current location, in case that the MTC device is operated illegally but said transceiver is not destroyed; and the MTC device sending once to the MTC server an alarm message, in case that the MTC device is operated illegally and said transceiver is destroyed, and said other MTC device(s) sending to the MTC server an alarm message and reporting information about its current location since it does not detect a legal broadcast signal sent by the MTC device.

According to another aspect of the present invention, a Machine Type Communication MTC device capable of collaboratively monitoring in a wireless communication network is proposed, wherein said MTC device is connected to a MTC server via said wireless communication network and includes a transceiver having a unique ID and security code, the transceiver periodically broadcasts its normal or abnormal status information to other MTC device(s) within a certain range in the vicinity of that MTC device and detects and identifies the other MTC device(s) within said range, the MTC device also including: alarm message sending means for sending to the MTC server an alarm message in case that the MTC device is operated illegally; first location information reporting means for reporting to the MTC server information about the current location of the MTC device in case that the MTC device is operated illegally but the transceiver is not destroyed; and second location information reporting means for sending to the MTC server an alarm message and reporting information about its current location in case that no legal broadcast signal sent by said other MTC device(s) is detected.

According to yet another aspect of the present invention, a system for implementing a collaborative monitoring in a wireless communication network is proposed, the system comprising: at least two MTC devices according to the present invention; at least one MTC server interacting with the MTC devices to handle their status and location information; and a wireless communication network, wherein said MTC devices and said MTC server communicate with each other via said wireless communication network.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

The basic idea of the present invention consists in equipping each of the MTC devices within a wireless metropolitan area network with transceivers as well as GPS locators if needed. All of the MTC devices located in a specific area is connected to each other and covered by the wireless access network. The specific illegal operation (such as a password error, a destroyed transceiver, a location change etc.) to a MTC device may cause its neighbor MTC device to be not able to receive normal signals. This event and the location information of the MTC device detecting this event may be reported to the MTC server, thereby getting known the approximate location of the stolen or destroyed MTC device. The detection range of MTC device may be set by person, for example 50 meters, 100 meters etc.

The transceiver contained within the MTC device has a unique ID which can be distinguished by a MTC server and a security code. This transceiver can detect and identify the MTC device(s) located within its detection area. If a new MTC device moves into its detection area, then it will send a confirmation request to that MTC device. Once this new MTC has received the confirmation request, it will reply with a legal/illegal message depending on its current status. When the transceiver has received an illegal message from this new MTC device or has not received any confirmation message, it will send an alarm message to the MTC server.

Figure 1:
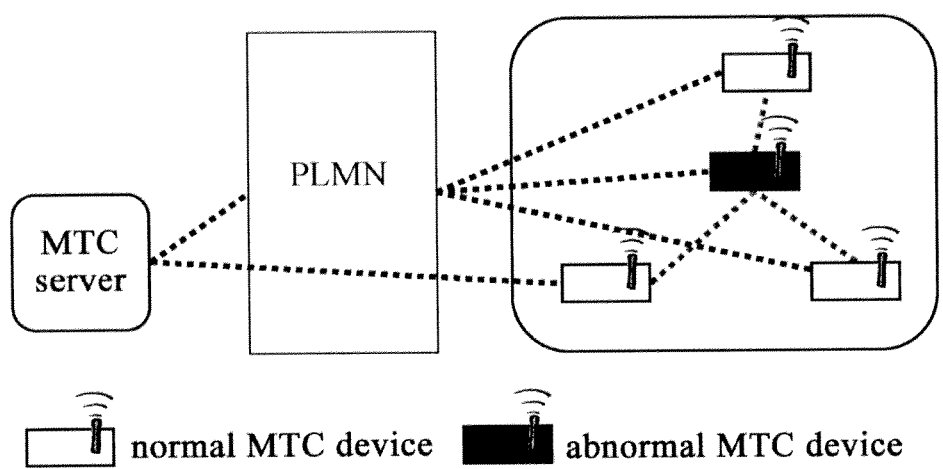
FIG. 1 schematically shows the architecture of the system based on the conception of the present invention.

FIG. 1 schematically shows the architecture of the system applying the present invention, wherein the MTC server is connected to a plurality of MTC devices via the PLMN (Public Land Mobile Network). A MTC device periodically broadcasts its status (normal or abnormal) to other MTC devices within a particular range so that all of the MTCs in this range can communicate and identify with each other. Said range may be set according to the adopted wireless transmission technology, such as WiFi, ZigBee, UWB, FID etc. Each of the MTC devices may legally operate with its security access password.

Furthermore, the MTC device may include or not include a GPS locator for measuring the real-time GPS location of the MTC Device, depending on whether the MTC Device is within a static or nomadic system or device, the static system or device being for example a personal computer, and the nomadic system or device being for example a vehicle. The static MTC device does not necessarily include a GPS locator, because that its location information may be pre-stored the MTC server (its location information being updated when the static device is moved), and its stolen or destroyed event may be detected by other MTC devices and its location may also be tracked by other MTC devices.

Optionally, the MTC server could store the location information of MTC device. If the MTC server has stored the location information of MTC device, then the static MTC device only needs to send an alarm message and report its ID to the MTC server while a stolen or destroyed situation is detected.

Figure 2:
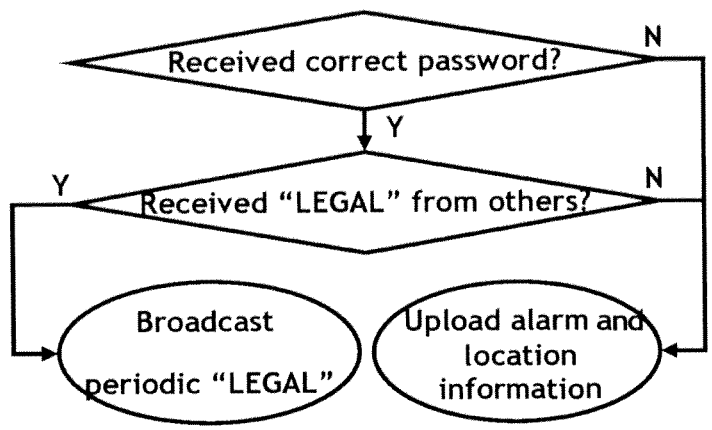
FIG. 2 schematically shows the collaborative secure access procedure based on the conception of the present invention.

FIG. 2 schematically shows the collaborative secure access procedure based on the conception of the present invention. As shown in FIG. 2, when the MTC device is moved without a correct password and its transceiver is not destroyed, the moved MTC device will send an alarm message and current location (or ID) to the server, and meanwhile broadcast illegal signals to other MTC devices for a quick tracking and recovery. When the MTC device is moved and the transceiver is destroyed, the MTC device will send once to the MTC server an alarm message before the power off and cut off legal broadcast signals, and other MTC devices within the same detection area do not detect the legal broadcast signals sent by this MTC device and send to the MTC server alarm messages and their current location. Thereby, the approximate geographic location of the moved or destroyed MTC device can be deduced from the current location information of the MTC devices detecting the abnormal situation.

Figure 3:
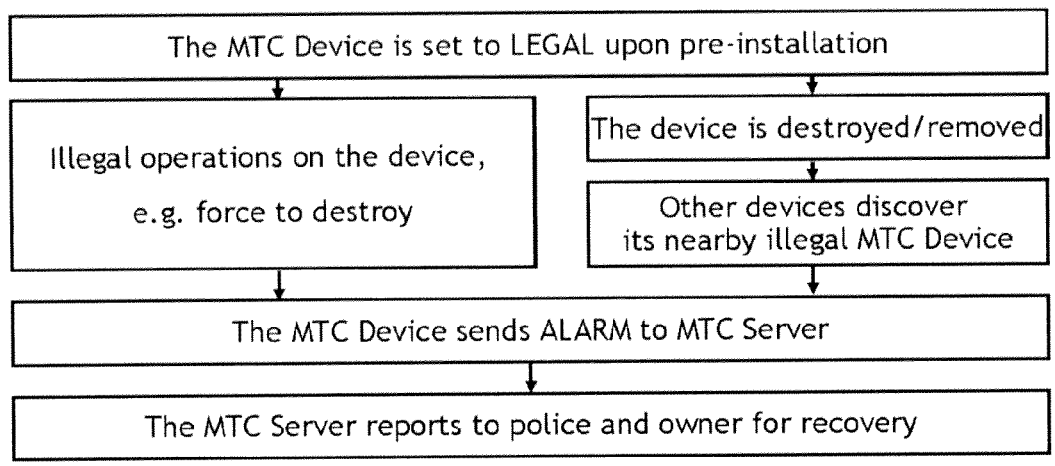
FIG. 3 schematically shows the collaborative detection procedure based on the conception of the present invention.

FIG. 3 schematically shows the collaborative detection procedure based on the conception of the present invention. As shown in FIG. 3, any operation which causes the transceiver to be destroyed/moved will trigger to automatically send an alarm message to the MTC server, and than this event may be reported to other organizations, such as the mobile phone of the owner or the police. A movable MTC device may be equipped with a GPS locator and has a direct uplink access to the MTC server, so that other MTC devices can help recovery its location by collaboratively monitoring while the locator of one MTC device is destroyed.

By using the solution of the present invention, a theft/destruction event can be immediately detected and the location of the stolen/destroyed device and be successively tracked.

It should be clear, the solution of the present invention is applicable to many scenarios, such as (but not limited to):
vehicle anti-theft system: which is very robust and help police quick recover a stolen vehicle, since it allows continuous tracking of any stolen vehicle during a rather long period after the vehicle having been stolen and the alarm tracker having been destroyed;
accident reporting: where the vehicle is seriously damaged but its transceiver continues to work, other passing vehicles or highway roadside devices are able to report this accident at the first time;
any vehicle with illegal status, e.g. no tax/no insurance, will be detected immediately by police station;
owner of vehicle is capable of alarming the police if any criminal events need to be reported.

Figure 4:
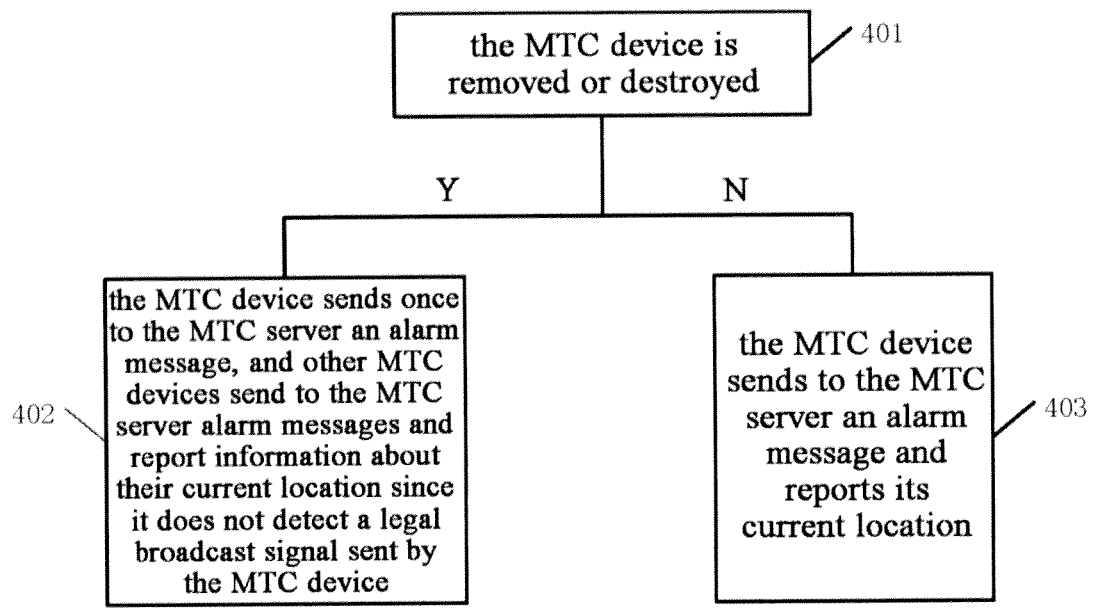
FIG. 4 is a flowchart of the method for collaboratively monitoring in a wireless communication network by means of MTC devices according to an embodiment of the present invention.

The method for collaboratively monitoring in a wireless communication network by means of MTC devices according to an embodiment of the present invention will described below with reference to FIG. 4. The method of the present embodiment may be applicable to for example the system as shown in FIG. 1, the description about which will not be repeated herein. As described above, each of the MTC devices is connected to the MTC server via a wireless communication network (such as PLMN) and includes a transceiver having a unique ID and security code. This transceiver periodically broadcasts its normal or abnormal status information to other MTC devices within a certain range in the vicinity that MTC device and detects and identifies other MTC devices within said range. It should be noted that, said range may be set according to the adopted wireless transmission technology, such as WiFi, ZigBee, UWB, RFID etc.

Herein, said MTC device may also include a GPS locator for reporting its current location in real time when it is contained in a movable system or device (such as vehicle).

The detection and identification for other MTC devices within its range by said transceiver comprise: when the transceiver receives a confirmation request from other MTC devices, it will send a legal/illegal message to other MTC devices upon the current status of that MTC device, wherein if other MTC devices receive an illegal message from this transceiver or do not receive any confirmation message, then they will send to the MTC server alarm signals and report its current location.

In step 401, the MTC device is operated illegally. Herein, the illegal operation includes (but not limited to) password error, transceiver destroyed, location change etc.

If the transceiver in the MTC device is destroyed, then in step 402, the MTC device will send once an alarm message to the MTC server, and other MTC devices send to the MTC server alarm messages and report information about its current location since they do not detect legal broadcast signals sent by that MTC device.

If the transceiver in the MTC device is not destroyed, then in step 403, the MTC device will send to the MTC server an alarm message and report information about its current location.

It should be noted that, if the MTC server has stored address information of MTC devices within a static system or device (such as a personal computer), then it only needs to report to the MTC server the unique ID of the transceiver.

It should also be noted that, the protocols used for signaling interaction between the MTC server and the MTC devices vary depending on different types of systems or devices (such as a vehicle, mobile phone etc.) equipped with the MTC devices It can be therefore seen that, by using the collaborative monitoring method of the present embodiment, the prior art problem that the current location of a stolen/destroyed system or device can not be tracked may be solved.

Based on the same inventive concept, according to another aspect of the present invention, a MTC device capable of collaboratively monitoring within wireless communication network is proposed. The MTC device will be described in the following with reference to the attached figure.

Figure 5:
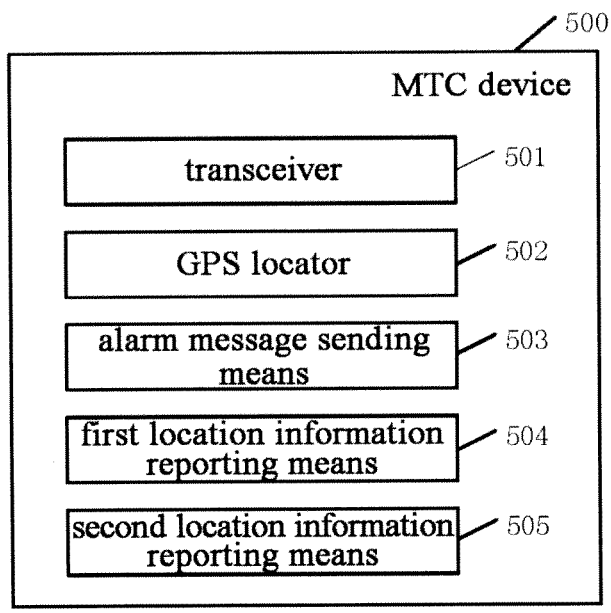
FIG. 5 is a block diagram of a MTC device according to an embodiment of the present invention.

FIG. 5 shows a MTC device 500 according to an embodiment of the present invention. This MTC device 500 includes a transceiver 501, a GPS locator 502, an alarm message sending means 503, a first location information reporting means 504 and a second location information reporting means 505. As described above, the transceiver 501 has a unique ID and security code, and periodically broadcasts its normal or abnormal status information to other MTC devices within a certain range in the vicinity of the MTC device 500, and detects and identifies other MTC devices within said range as described above. It should be noted that, said range may be set depending on the adopted wireless transmission technology, such as WiFi, ZigBee, UWB, RFID etc. said GPS locator 502 is used for measuring the real time GPS location of the MTC device 500. It should be noted that, the MTC device may include or not include this GPS locator 502. For example, the MTC device may not include the GPS locator 502 when it is within a static system or device, because that its location information may be pre-stored into the MTC server and its theft or destruction event may be detected by other MTC devices and its location may also be tracked by other MTC devices. The alarm message sending means 503 is used for sending an alarm message to the MTC server while the MTC device is operated illegally. The first location information reporting means 504 is used for reporting to the MTC server information about the current location of the MTC device 500 in case that the MTC device 500 is operated illegally but the transceiver it contains is not destroyed. The second location information reporting means 505 is used for sending an alarm message to the MTC server and reporting information about its current location in case that no legal broadcast signals sent by other MTC devices are detected.

In implementation, the MTC device 500 and the transceiver 501, the GPS locator 502, the alarm message sending means 503, the firs location information reporting means 504 and the second location information reporting means 505 it contains of this embodiment may be implemented in software, hardware or a combination of them. For example, those skilled in the art are familiar with a variety of devices which may be used to implement these components, such as microprocessor, micro-controller, ASIC. PLD and/or FPGA etc. Those respective components of the MTC device of the present embodiment may be implemented separately physically but interconnected operatively.

In operation, the MTC device capable of collaboratively monitoring in the wireless communication network of the embodiment illustrated in connection with FIG. 5, may implement the above described collaborative monitoring method. By using the MTC device, the prior art problem that the current location of a stolen/destroyed system or device can not be tracked may be solved.

Based on the same inventive concept, according to yet another aspect of the present invention, a system is proposed, which comprises at least two MTC devices of above described embodiment, at least one MTC server interacting with said MTC devices to handle their status and location information, as well as a wireless communication network via which the MTC devices and the MTC server can communicate with each other. Said wireless communication network is for example a PLMN.

For example, in the system of the present embodiment, one MTC device monitors the legal/illegal status of another MTC device, and sends an alarm message to the MTC server via said wireless communication network in case of a theft or destruction event, and reports its current location if needed. The detailed operation process may refer to the above described collaborative monitoring method according to the embodiment of the present invention, and unnecessarily detailed description thereof will not be given out any more herein.

Although the exemplary embodiments of the collaborative monitoring method, MTC devices and system are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for collaboratively monitoring by Machine Type Communication MTC devices in a wireless communication network, wherein each of the MTC devices is connected to a MTC server via said wireless communication network and includes a transceiver having a unique ID and security code, and said transceiver periodically broadcasts its normal or abnormal status information to other MTC devices within a certain range in the vicinity of that MTC device and detects and identifies other MTC devices within said range, wherein said method comprises:

the MTC device sending to the MTC server an alarm message and reporting information about current location of the MTC device, when the MTC device is operated illegally but said transceiver is not destroyed; and the MTC device sending once to the MTC server an alarm message, when the MTC device is operated illegally and said transceiver is destroyed, and said other MTC device(s) sending to the MTC server an alarm message and reporting information about said other MTC device(s) current location since said other MTC device(s) does not detect a legal broadcast signal sent by the MTC device.

2. The method according to claim 1, wherein the MTC device is used for a movable system or device and includes also a GPS locator for measuring the real time location of the MTC device so as to report to the MTC server.

3. The method according to claim 1, wherein the MTC server stores information about the current location of the MTC devices.

4. The method according to claim 1, wherein said illegal operation comprises password error, transceiver destroyed, or location change.

5. The method according to claim 1, wherein the detection and identification for said other MTC device(s) within said range by said transceiver include:
- sending, by the transceiver, a legal/illegal message to said other MTC device(s) based on the current status of the MTC device when the transceiver has received a confirmation request from said other MTC device(s),
- wherein said other MTC device(s) will send an alarm signal to the MTC server and report information about its current location in case that the other MTC device has received an illegal message from said transceiver or has not received any confirmation message.

6. A Machine Type Communication MTC device capable of collaboratively monitoring in a wireless communication network, wherein said MTC device is connected to a MTC server via said wireless communication network and includes a transceiver having a unique ID and security code, the transceiver periodically broadcasts its normal or abnormal status information to other MTC device(s) within a certain range in the vicinity of that MTC device and detects and identifies the other MTC device(s) within said range, wherein the MTC device includes one or more processors configured to:
- send to the MTC server an alarm message in case the MTC device is operated illegally;
- report to the MTC server information about the current location of the MTC device in case that the MTC device is operated illegally but the transceiver is not destroyed; and
- send to the MTC server an alarm message and reporting information about the current location of the MTC device when no legal broadcast signal sent by said other MTC device(s) is detected.

7. The MTC device according to claim 6, wherein the MTC device is used for a movable system or device and includes a GPS locator for measuring the real time location of the MTC device so as to report to the MTC server.

8. The MTC device according to claim 6, wherein said MTC server stores information of the current location of the MTC devices.

9. The MTC device according to claim 6, wherein said illegal operation comprises password error, transceiver destroyed, or location change.

10. The MTC device according to claim 6, wherein the detection and identification for said other MTC device(s) within said range by said transceiver include:
- sending, by the transceiver, a legal/illegal message to said other MTC device(s) based on the current status of the MTC device when the transceiver has received a confirmation request from said other MTC device(s),
- wherein said other MTC device(s) send an alarm signal to the MTC server and report information about its current location in case that the other MTC device has received an illegal message from said transceiver or has not received any confirmation message.

11. A system for implementing a collaborative monitoring in a wireless communication network, wherein it comprises:
- at least two MTC devices according to claim 6;
- at least one MTC server interacting with the MTC devices to handle the status and location information of the at least two MTC devices; and
- a wireless communication network, wherein said MTC devices and said MTC server communicate with each other via said wireless communication network.

\* \* \* \* \*